(12) United States Patent
Lee

(10) Patent No.: US 10,413,868 B2
(45) Date of Patent: Sep. 17, 2019

(54) DEVICES FOR PURIFYING EXHAUST GAS

(71) Applicants: Hyundai Motor Company, Seoul (KR); Kia Motors Corporation, Seoul (KR)

(72) Inventor: Hyokyung Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/799,794

(22) Filed: Oct. 31, 2017

(65) Prior Publication Data

US 2018/0133652 A1  May 17, 2018

(30) Foreign Application Priority Data

Nov. 17, 2016 (KR) .................. 10-2016-0153507

(51) Int. Cl.
*F01N 3/035* (2006.01)
*B01D 53/94* (2006.01)
(Continued)

(52) U.S. Cl.
CPC ....... *B01D 53/9477* (2013.01); *B01D 53/885* (2013.01); *B01D 53/94* (2013.01); *B01D 53/944* (2013.01); *B01D 53/9418* (2013.01); *B01D 53/9495* (2013.01); *B01J 29/061* (2013.01); *B01J 29/7053* (2013.01); *F01N 3/035* (2013.01); *F01N 3/103* (2013.01); *F01N 3/208* (2013.01); *F01N 13/009* (2014.06); *F01N 13/16* (2013.01); *B01D 2255/50* (2013.01); *B01D 2255/904* (2013.01); *B01D 2255/915* (2013.01);
(Continued)

(58) Field of Classification Search
CPC .... F01N 3/0814; F01N 3/103; F01N 2370/04; B01D 2255/50; B01J 29/061; B01J 29/7053
See application file for complete search history.

(56) References Cited

U.S. PATENT DOCUMENTS

| | | |
|---|---|---|
| 9,034,269 B2 | 5/2015 | Hilgendorff et al. |
| 2014/0030158 A1 | 1/2014 | Takagi et al. |
| 2015/0360178 A1* | 12/2015 | Kalwei ............... B01D 53/944 423/212 |

FOREIGN PATENT DOCUMENTS

| | | |
|---|---|---|
| EP | 2 108 441 A1 | 10/2009 |
| EP | 2695674 A1 | 2/2014 |

(Continued)

OTHER PUBLICATIONS

European Search Report dated Apr. 6, 2018 in European Patent Application No. 17201583.6.

*Primary Examiner* — Jonathan R Matthias
(74) *Attorney, Agent, or Firm* — Morgan, Lewis & Bockius LLP

(57) ABSTRACT

A device for purifying exhaust gas may be provided to purify exhaust gas in an engine includes an exhaust line through which exhaust gas discharged from the engine passes, a diesel oxidation catalyst (DOC) that is disposed in the exhaust line to purify hydrocarbon (HC) and carbon monoxide (CO) of the exhaust gas, a urea injector that injects a urea aqueous solution into the exhaust line, and a selective catalyst reduction (SCR) that reduces nitrogen oxide of the exhaust gas passing through the DOC by use of the urea aqueous solution, in which the DOC includes an LTA zeolite catalyst.

10 Claims, 6 Drawing Sheets

(51) Int. Cl.
 *F01N 13/00* (2010.01)
 *B01J 29/70* (2006.01)
 *F01N 3/10* (2006.01)
 *F01N 3/20* (2006.01)
 *B01D 53/88* (2006.01)
 *B01J 29/06* (2006.01)
 *F01N 13/16* (2010.01)

(52) U.S. Cl.
 CPC ........ *F01N 3/2066* (2013.01); *F01N 13/0097* (2014.06); *F01N 2330/06* (2013.01); *F01N 2370/04* (2013.01); *F01N 2610/02* (2013.01); *F01N 2610/1453* (2013.01)

(56) References Cited

FOREIGN PATENT DOCUMENTS

| | | |
|---|---|---|
| EP | 2 966 277 A1 | 1/2016 |
| GB | 2522775 A | 8/2015 |
| JP | 5000405 B2 | 8/2012 |
| KR | 10-2014-002772 A | 1/2014 |

* cited by examiner

DEVICES FOR PURIFYING EXHAUST GAS

CROSS-REFERENCE(S) TO RELATED APPLICATIONS

The present application claims priority to Korean Patent Application No. 10-2016-0153507 filed on Nov. 17, 2016, the entire contents of which is incorporated herein for all purposes by this reference.

BACKGROUND OF THE INVENTION

Field of the Invention

The present invention relates to a device for purifying exhaust gas, and more particularly, to a device for purifying exhaust gas configured for reducing harmful materials in exhaust gas using a Linde Type A (LTA) zeolite catalyst with an improved high-temperature performance.

Description of Related Art

In general, an exhaust system of an engine includes an exhaust gas post-processing device including a diesel oxidation catalyst (DOC), a diesel particulate matter filter (DPF), a selective catalyst reduction (SCR) and a lean $NO_x$ trap (LNT) catalyst to reduce carbon monoxide (CO), hydrocarbons (HC), a particulate matter, nitrogen oxide ($NO_x$), and the like which are pollutants included in the exhaust gas.

The DOC may oxidize total hydrocarbon and carbon monoxide in the exhaust gas and oxidize nitrogen monoxide to nitrogen dioxide.

The DPF may collect a particulate material included in the exhaust gas and purify the particulate material through a chemical conversion process.

Further, in the SCR, a reducing agent (urea) injected in a stream direction of the exhaust gas through an injector is converted into ammonia ($NH_3$) by heat of the exhaust gas, and as a catalytic reaction of nitrogen oxide and ammonia in exhaust gas by the SCR catalyst, nitrogen oxide is reduced to nitrogen gas ($N_2$) and water ($H_2O$).

In addition, recently, as emissions regulations for the vehicle are enhanced, improvement of a nitrogen oxide purification performance for the SCR system is required and particularly, a technique for reducing nitrogen oxide in the non-operating region of the SCR during a cold start is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for purifying exhaust gas having the advantages of improving an exhaust gas purification performance by improving a high-temperature performance of a DOC, by applying an LTA zeolite catalyst to a diesel oxidation catalyst (DOC).

Various aspects of the present invention are directed to providing a device for purifying exhaust gas configured to purify exhaust gas in an engine, the device including: an exhaust line through which exhaust gas discharged from the engine passes, a diesel oxidation catalyst (DOC) that is disposed in the exhaust line to purify hydrocarbon (HC) and carbon monoxide (CO) of the exhaust gas, a urea injector that injects a urea aqueous solution into the exhaust line, and a selective catalyst reduction (SCR) that reduces nitrogen oxide of the exhaust gas passing through the DOC by use of the urea aqueous solution, in which the DOC includes an LTA zeolite catalyst.

The LTA zeolite catalyst may include at least one of Pt, Pd, Rh, Fe, Cu, Ag, Mn, Co and Mg.

The LTA zeolite catalyst may include approximately 0.1 wt % to approximately 3 wt % of Pb based on the total weight of the LTA zeolite catalyst.

The device may further include a diesel particulate matter filter (DPF) that is formed at the rear end portion of the DOC or the front end portion of the SRC and reduces a particulate matter of the exhaust gas.

When a predetermined amount of particulate matter is collected in the DPF, a temperature of the front end portion of the DPF may be controlled to be a predetermined temperature or higher.

The DOC may store $NO_x$ in the exhaust gas in an inactive region of the SCR and detach the stored $NO_x$ after the SCR is activated.

The temperature in the inactive region of the SCR may be less than the temperature after the SCR is activated.

The DOC may store $NO_x$ generated in a lean condition with a lot of oxygen in the exhaust gas.

Various aspects of the present invention are directed to providing a device for purifying exhaust gas configured to purify exhaust gas in an engine, the device including: a front catalyst device that is disposed on an exhaust line through which exhaust gas discharged from the engine passes and includes a diesel oxidation catalyst (DOC); and a rear catalyst device that is connected to the front catalyst device and includes a selective catalyst reduction (SCR), in which the DOC includes an LTA zeolite catalyst.

The front catalyst device or the rear catalyst device may include a diesel particulate matter filter (DPF) that reduces a particulate matter of the exhaust gas.

The device may further include a urea injector that injects a urea aqueous solution into the exhaust line; and a control device that is configured to control the injection of the urea aqueous solution and controls the temperature of the exhaust gas to be a predetermined temperature or higher when a predetermined amount of particulate matter is collected in the DPF.

The DOC may store $NO_x$ in the exhaust gas in an inactive region of the SCR and detach the $NO_x$ stored in the DOC after the SCR is activated.

The LTA zeolite catalyst may include at least one of Pt, Pd, Rh, Fe, Cu, Ag, Mn, Co and Mg.

The LTA zeolite catalyst may include approximately 0.1 wt % to about 3 wt % of Pb based on the total weight of the LTA zeolite catalyst.

According to the exemplary embodiment of the present invention, an LTA zeolite catalyst with improved high temperature performance is applied to the diesel oxidation catalyst (DOC), and thus it is possible to provide an environment that can improve the purification performance of nitrogen oxide and improve fuel economy.

Further, in an inactive region of selective catalyst reduction (SCR), the nitrogen oxide is stored in the LTA zeolite catalyst and in the SCR activated area, the nitrogen oxide is detached, and thus it is possible to provide an environment that can reduce the nitrogen oxide for the inactive region of the SCR during a cold start.

Further, it is possible to provide an environment that can prevent degradation of DOC due to a temperature increase according to regeneration of a diesel particulate matter filter (DPF).

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
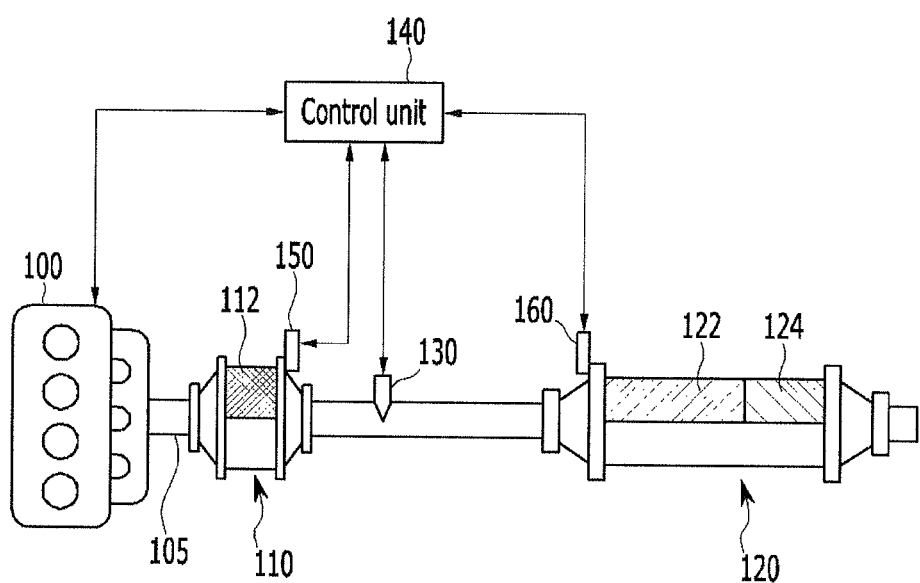
FIG. 1 is a diagram schematically illustrating a structure of a device for purifying exhaust gas according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A device for purifying exhaust gas according to an exemplary embodiment of the present invention may be applied to not only vehicles but also various devices which burn fossil fuels to obtain energy and emit gas generated in the process to the environment. In the present specification, it is exemplified that the device for purifying exhaust gas is applied to the vehicles, but it may not be interpreted that the device for purifying exhaust gas is applied to only the vehicles.

An engine for generating power is mounted on the vehicle. The engine converts chemical energy into mechanical energy by burning a mixture of fuel and air. The engine is connected to an intake manifold to receive air into a combustion chamber and connected to an exhaust manifold to collect the exhaust gas generated in the combustion process in the exhaust manifold and discharge the collected exhaust gas to the outside of the vehicle. In the combustion chamber or the intake manifold, an injector is mounted to inject the fuel into the combustion chamber or the intake manifold.

The exhaust gas generated in the engine is discharged to the outside of the vehicle through the exhaust device. The exhaust device may include an exhaust pipe and an exhaust gas recirculation (EGR) device.

The exhaust pipe is connected to the exhaust manifold to discharge the exhaust gas to the outside of the vehicle.

The EGR device is mounted on the exhaust pipe and the exhaust gas discharged in the engine passes through the EGR device. Further, the EGR device is connected to the intake manifold to control a combustion temperature by mixing a portion of the exhaust gas with the air. The combustion temperature may be adjusted by controlling an on and/or off state of an EGR valve provided in the EGR device. That is, an amount of the exhaust gas supplied to the intake manifold is adjusted by controlling the on and/or off state of the EGR valve.

The exhaust device may further include a particulate filter that is mounted on the exhaust pipe and configured to collect a particulate material included in the exhaust gas. The particulate filter may be a device for purifying exhaust gas according to the exemplary embodiment of the present invention for purifying a harmful material other than the particulate material included in the exhaust gas.

Hereinafter, the device for purifying exhaust gas according to the exemplary embodiment of the present invention will be described in detail with reference to the accompanying drawings.

FIG. 1 is a diagram schematically illustrating a structure of a device for purifying exhaust gas according to various exemplary embodiments of the present invention. In the present case, in the device for purifying exhaust gas, only schematic configurations required for description according to the exemplary embodiment of the present invention are illustrated and the present invention is not limited to the configurations.

Referring to FIG. 1, the device for purifying exhaust gas according to the various exemplary embodiments of the present invention includes an exhaust line 105 through which exhaust gas discharged from an engine 100 passes, a front catalyst device 110 disposed on the exhaust line 105 through which the exhaust gas discharged from an engine 100 passes, a rear catalyst device 120 which is connected to the front catalyst device 110, a urea injector 130 which injects a urea aqueous solution into the exhaust line 105, and a control device 140 which controls the injection of the urea aqueous solution.

The front catalyst device 110 includes a diesel oxidation catalyst (DOC) 112 according to an exemplary embodiment of the present invention.

The DOC 112 is disposed on the exhaust line 105 through which exhaust gas discharged from an engine 100 passes and may purify hydrocarbon (HC) and carbon monoxide (CO).

In addition, the DOC 112 may include a LTA zeolite catalyst according to an exemplary embodiment of the present invention. The LTA zeolite catalyst may include at least one of Pt, Pd, Rh, Fe, Cu, Ag, Mn, Co and Mg.

Hereinafter, a process of manufacturing the LTA zeolite catalyst according to the exemplary embodiment of the present invention will be described.

A method for manufacturing the catalyst according to an exemplary embodiment of the present invention includes preparing LTA zeolite having a Si:Al ratio of more than 1, preparing LTA zeolite including ions by substituting ions in the LTA zeolite for ions, and preparing copper type LTA zeolite by performing copper (Cu) ion exchange of the LTA zeolite including ions, and a ratio of copper and aluminum is 0.14 to 0.58. However, the present invention is not limited thereto, and a ratio of active metal and aluminum may be adjusted according to a use environment of the catalyst.

First, the preparing of the LTA zeolite will be described. The LTA zeolite may be prepared using a seed and also prepared without using the seed. A Si:Al ratio of the LTA zeolite prepared in the present process may be more than 1. The Si:Al ratio may be 5 to 50. The Si:Al ratio may be 5 to 30. The Si:Al ratio may be 8 or more.

As an example, the process of preparing the LTA zeolite using the seed will be described.

To prepare the LTA zeolite, first, the LTA zeolite may be prepared by mixing an LTA seed with a mixture of aluminum hydroxide ($Al(OH)_3$) and tetraethyl orthosilicate ($Si(OC_2H_5)_4$).

A first mixture is prepared by mixing a 1,2-dimethyl-3-(4-methylbenzyl)imidazolium hydroxide aqueous solution and aluminum hydroxide ($Al(OH)_3$) and performing primary stirring, and additionally mixing tetramethylammonium hydroxide pentahydrate and performing secondary stirring.

Herein, the first mixture may be prepared by mixing 20 to 35 wt % of 1,2-dimethyl-3-(4-methylbenzyl)imidazolium hydroxide, 1 to 2 wt % of aluminum hydroxide, 1 to 5 wt % of tetramethylammonium hydroxide pentahydrate, and a residue amount of water with respect to a total weight of the first mixture, and the primary stirring and the secondary stirring may be performed for 0.5 hr to 1.5 hrs.

A second mixture is prepared by mixing tetraethyl orthosilicate ($Si(OC_2H_5)_4$; TEOS) with the prepared first mixture and performing tertiary stirring and then mixing a LTA seed and performing quaternary stirring.

The tetraethyl orthosilicate (TEOS) may be mixed with 30 to 35 wt % with respect to a total weight of the second mixture may be mixed and the LTA seed may be mixed with 2 to 6 wt % with respect to a total weight of all silicon ingredients included in the LTA zeolite.

Further, the tertiary stirring may be performed for 2 to 4 hrs and the quaternary stirring may be performed for 20 to 28 hrs.

Thereafter, a third mixture is prepared by sufficiently heating the second mixture to evaporate ethanol and water generated due to hydrolysis of tetraethyl orthosilicate (TEOS).

The heating of the second mixture may be performed at a temperature of 70° C. to 90° C.

Thereafter, a fourth mixture is prepared by mixing a hydrogen fluoride (HF) aqueous solution with the third mixture and performing heating, washing, and drying processes.

Herein, the heating of the third mixture may be performed at a temperature of 150° C. to 200° C. for a predetermined time, the washing may be performed several times, and the drying may be performed at room temperature.

Next, the LTA zeolite for preparing the zeolite catalyst according to the exemplary embodiment of the present invention is prepared by performing additional heat treatment for removing an organic material of the fourth mixture.

The additional heat treatment may be performed at 500° C. to 700° C. for 6 to 10 hrs and in the LTA zeolite according to the exemplary embodiment, the Si:Al ratio may be 5 to 50.

Further, in the case of preparing the LTA zeolite without the seed, the LTA zeolite may be prepared by the following method. 0.0 mole to 0.2 mole of aluminum hydroxide and 0.0 mole to 0.2 mole of tetramethylammonium hydroxide (hereinafter, TMAOH) are added with 0.1 mole to 1.0 mole of 1,2-dimethyl-3-(4-methylbenzyl)imidazolium hydroxide (hereinafter, 12DM3 (4MB)IOH) as an organic structure-induced molecule and sufficiently stirred in a plastic beaker. Next, tetraethyl orthosilicate (hereinafter, TEOS) is added to have a ratio of 1 mole with respect to the reactants and sufficiently stirred again.

Next, the solution is sufficiently heated at 60° C. to 100° C. until water becomes 0 mole to 10 moles while completely removing ethanol generated due to the hydrolysis of TEOS added to the solution. Finally, 0.1 to 1.0 mole of hydrogen fluoride (HF) is added and sufficiently mixed to obtain a reaction mixture having a desired composition.

The reaction mixture is transferred to a Teflon reactor and put in a container made of stainless steel again, heated at 100° C. to 200° C. for 0.1 to 14 days to prepare the LTA zeolite. Even in the LTA zeolite prepared by the method, the Si:Al ratio may be 5 to 50. However, the preparing method is exemplified and is not limited by the aforementioned method.

Next, a process of preparing the LTA zeolite including ions using the prepared LTA zeolite will be described in detail.

First, the LTA zeolite is put into an ammonium salt, refluxed, washed, and dried to prepare an $NH_4$ type LTA zeolite including $NH_4+$ ions.

Herein, the ammonium salt may be ammonium nitrate ($NH_4NO_3$).

The refluxing process may be performed at a temperature of 60° C. to 100° C. for 5 to 7 hrs.

In the exemplary embodiment, the ions exemplify ammonium ions, but are not limited thereto. That is, a use of other ions or ionic salts is also included in the range of the present invention.

Next, a process of preparing the copper type LTA zeolite by performing copper (Cu) ion exchange in the LTA zeolite including ions will be described. In the copper type LTA zeolite prepared in the process, a ratio of copper and aluminum may be 0.14 to 0.58. The ratio is 0.32 to 0.48. However, the present invention is not limited to the ratio and the ratio of copper and aluminum may be 0.1 to 0.7. The ratio of copper and aluminum may be properly adjusted according to an environmental condition to use the catalyst.

Further, when the content of copper is represented by wt %, the content of copper may be 0.5 wt % to 5 wt %. Further, the content of copper may be 2.0 wt % to 3.0 wt %.

In the above process, copper type LTA zeolite including Cu ions may be prepared through copper (Cu) ion exchange of $NH_4$ type LTA zeolite including dried $NH_4+$ ions after preparing.

The copper ion exchange is put in a copper precursor solution including copper acetate monohydrate, copper nitride, copper nitrate, and copper sulfate and stirring is performed, and then washing and drying processes are performed to prepare the copper type LTA zeolite.

Next, the copper type LTA zeolite may be heat-treated after gradually increasing the temperature in an oven to prepare the catalyst according to the exemplary embodiment of the present invention.

Herein, the heat treatment of the copper type LTA zeolite may be performed for 1 to 24 hrs after increasing the temperature up to 400° C. to 750° C. at 1 to 30° C./min.

In the copper type LTA zeolite prepared in the process, a ratio of copper and aluminum may be 0.14 to 0.58. The ratio of copper and aluminum may be 0.32 to 0.48.

The ratio of copper and aluminum is a ratio having thermal stability and excellent $NO_x$ purification performance.

Hereinabove, the Cu/LTA catalyst including copper ions is described, but the present invention is not limited thereto.

For example, the LTA zeolite catalyst applied to the DOC 112 according to the exemplary embodiment of the present invention may include a Pd/LTA catalyst. In addition, when the content of Pd is represented by wt % with respect to the entire weight of the Pd/LTA catalyst, the content of Pd may be 0.1 wt % to 3 wt % with respect to the entire weight of the Pd/LTA catalyst.

As a result, in the device for purifying exhaust gas according to the exemplary embodiment of the present invention, the Pd/LTA catalyst with improved high-temperature performance is applied the DOC, preventing deterioration of the DOC due to a temperature increase according to the regeneration of the DPF.

In addition, the rear catalyst device 120 includes a diesel particulate matter filter (DPF) 122 and a selective catalyst reduction (SCR) 124 according to the exemplary embodiment of the present invention.

The DPF 122 is formed at the front end portion of the SCR 124 and reduces a particulate matter (PM) of the exhaust gas. Herein, the DPF 122 may be an SDPF (SCR on DPF) coated with the SCR catalyst on the DPF according to the exemplary embodiment of the present invention.

The SCR 124 may reduce nitrogen oxide ($NO_x$) of the exhaust gas which passes through the DOC 112 and the DPF 122 using the urea aqueous solution.

The control device 140 controls a urea injector 130 to inject the urea aqueous solution. In addition, the control device 140 receives a temperature measured in temperature detectors 150 and 160 and controls the temperature of the front end portion of the DPF 122 to be a predetermined temperature or higher when the predetermined amount of particulate matter is collected in the DPF 122. For example, the control device 140 may control the engine 100 so that the exhaust temperature discharged from the engine becomes 640° C. or more.

For the present purpose, the control device 140 may be implemented by one or more processors operated by a predetermined program, and the predetermined program may be programmed to perform respective steps of the method for purifying exhaust gas according to the exemplary embodiment of the present invention.

In addition, the DOC 112 stores $NO_x$ in the exhaust gas in an inactive region of the SCR 124 and detaches the stored $NO_x$ after the SCR 124 is activated. In addition, the SCR 124 may purify the detached $NO_x$ in the DOC 112. Herein, according to the exemplary embodiment of the present invention, the temperature in the inactive region of the SCR 124 is less than the temperature after the SCR 124 is activated.

Further, the DOC 112 stores $NO_x$ generated in a lean condition with a large amount of oxygen in the exhaust gas and may detach the stored $NO_x$ after the SCR 124 is activated. In the present case, the device for purifying exhaust gas according to the exemplary embodiment of the present invention need not to control the engine to be forcibly in a rich condition like a conventional lean $NO_x$ trap (LNT).

Figure 2:
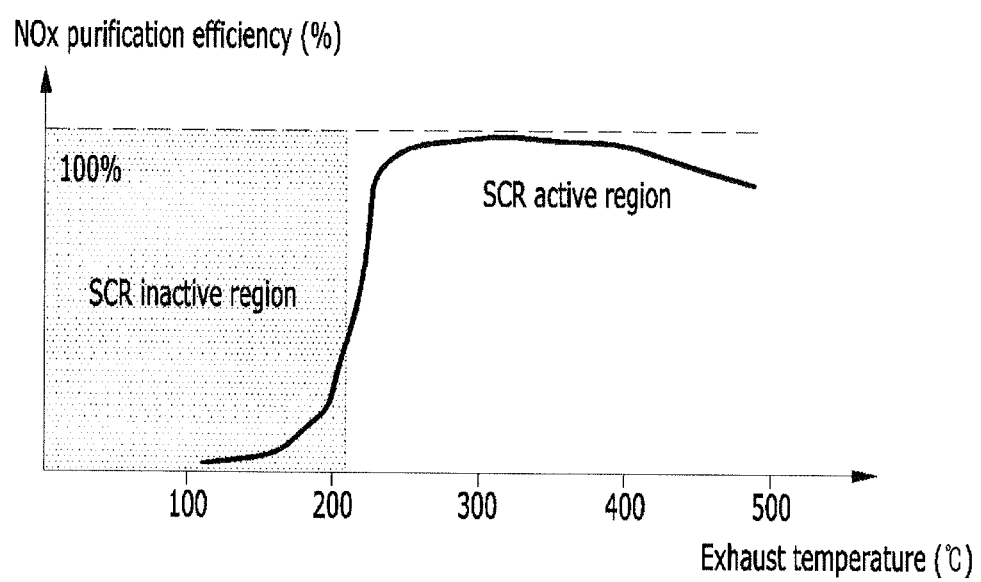
FIG. 2 is a graph of $NO_x$ purification efficiency according to an exhaust temperature.
Figure 3:
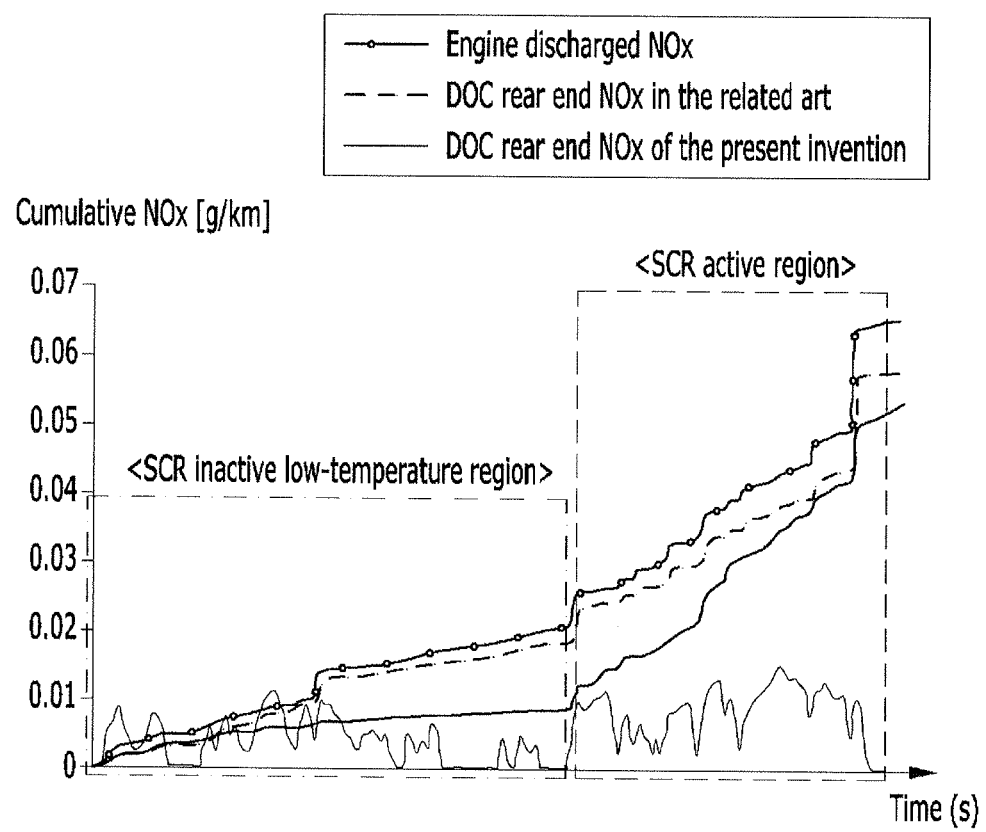
FIG. 3 is a graph illustrating a cumulative $NO_x$ amount according to an SCR operation according to the exemplary embodiment of the present invention.

FIG. 2 is a graph of $NO_x$ purification efficiency according to an exhaust temperature, and FIG. 3 is a graph illustrating a cumulative $NO_x$ amount according to an SCR operation according to the exemplary embodiment of the present invention.

Referring to FIG. 2 and FIG. 3, in the prior art, in a low-temperature region where the SCR is inactive during cold start, $NO_x$ purification efficiency is lowered.

However, according to the exemplary embodiment of the present invention, the DOC including the Pd/LTA catalyst stores $NO_x$ in the exhaust gas in the region where the SCR is inactive and detaches the $NO_x$ stored in the DOC after the SCR is activated. In addition, the activated SCR purifies the $NO_x$ detached from the DOC. Accordingly, the device for purifying exhaust gas according to the exemplary embodiment of the present invention may efficiently reduce nitrogen oxide generated in the inactive region of the SCR during a cold start.

Figure 4:
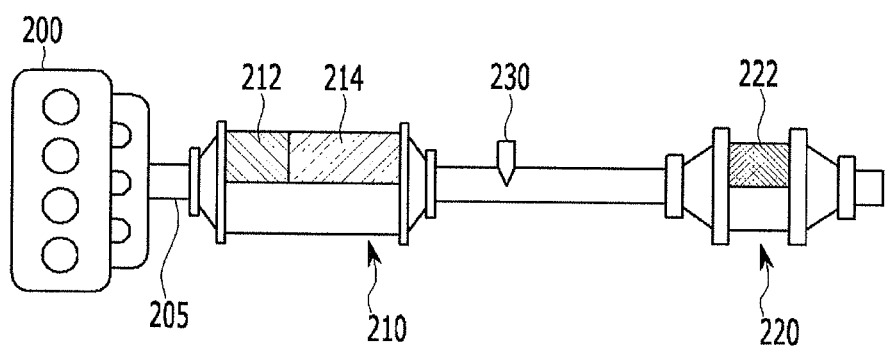
FIG. 4 is a diagram schematically illustrating a structure of a device for purifying exhaust gas according to various exemplary embodiments of the present invention.

FIG. 4 is a diagram schematically illustrating a structure of a device for purifying exhaust gas according to various exemplary embodiments of the present invention. In the present case, in the device for purifying exhaust gas, only schematic configurations required for description according to the exemplary embodiment of the present invention are illustrated and the present invention is not limited to the configurations.

Referring to FIG. 4, the device for purifying exhaust gas according to the various exemplary embodiments of the present invention includes an exhaust line 205 through which exhaust gas discharged from an engine 200 passes, a front catalyst device 210 disposed on the exhaust line 205 through which the exhaust gas discharged from an engine 200 passes, a rear catalyst device 220 which is connected to the front catalyst device 210, and a urea injector 230 which injects a urea aqueous solution into the exhaust line 205.

The front catalyst device 210 includes a diesel oxidation catalyst (DOC) 212 and a diesel particulate matter filter (DPF) 214 according to an exemplary embodiment of the present invention. Herein, the DOC 212 may include the Pd/LTA catalyst described in FIG. 1 and the detailed description of the common parts with FIG. 1 will be omitted.

In addition, the rear catalyst device 220 includes a selective catalyst reduction (SCR) 222 according to the exemplary embodiment of the present invention.

The urea injector 230 is disposed between the front catalyst device 210 and the rear catalyst device 220 to inject a urea aqueous solution into the exhaust line 205.

Figure 5:
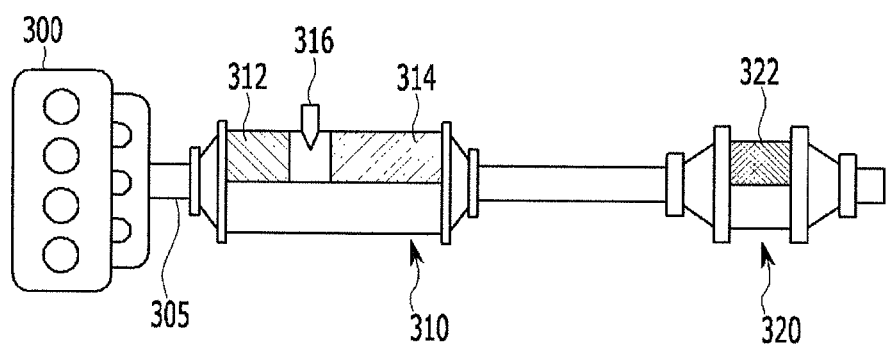
FIG. 5 is a diagram schematically illustrating a structure of a device for purifying exhaust gas according to various exemplary embodiments of the present invention.

FIG. 5 is a diagram schematically illustrating a structure of a device for purifying exhaust gas according to various exemplary embodiments of the present invention. In the present case, in the device for purifying exhaust gas, only schematic configurations required for description according to the exemplary embodiment of the present invention are illustrated and the present invention is not limited to the configurations.

Referring to FIG. 5, the device for purifying exhaust gas according to the various exemplary embodiments of the present invention includes an exhaust line 305 through which exhaust gas discharged from an engine 300 passes, a front catalyst device 310 disposed on the exhaust line 305 through which the exhaust gas discharged from the engine 300 passes, and a rear catalyst device 320 which is connected to the front catalyst device 310.

The front catalyst device 310 includes a diesel oxidation catalyst (DOC) 312, a diesel particulate matter filter (DPF) 314, and a urea injector 316 which injects a urea aqueous solution according to an exemplary embodiment of the present invention. Herein, the DOC 312 may include the Pd/LTA catalyst described in FIG. 1 and the detailed description of the common parts with FIG. 1 will be omitted.

In addition, the DPF 314 may be an SDPF (SCR on DPF) coated with the SCR catalyst on the DPF according to the exemplary embodiment of the present invention.

Further, the urea injector 316 may be disposed between the DOC 312 and the DPF 314.

In addition, the rear catalyst device 320 includes a selective catalyst reduction (SCR) 322 according to the exemplary embodiment of the present invention.

Figure 6:
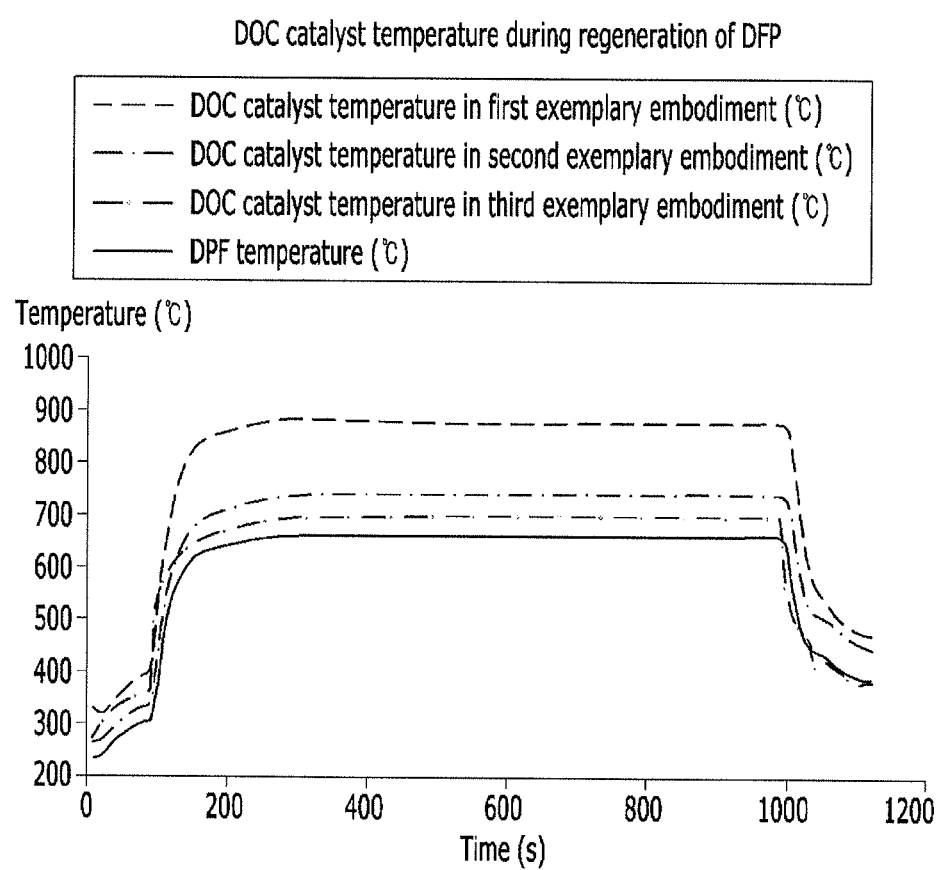
FIG. 6 is a graph illustrating a DOC catalyst temperature during regeneration of a PM according to each exemplary embodiment of the present invention.

FIG. 6 is graph illustrating a DOC catalyst temperature during PM regeneration according to each exemplary embodiment of the present invention.

Referring to FIG. 6, when a predetermined amount of PM is collected in the DPF, the exhaust gas temperature discharged from the engine is controlled to be 640° C. or more to remove the collected PM. In addition, the temperature of the DOC catalyst of during regeneration of the DPF rises up to 700° C. to 900° C. Accordingly, in the prior art, in the case of regenerating the DPF for removing the PM collected in the DPF, the exhaust gas temperature increases to cause degradation of the DOC catalyst.

However, in the device for purifying exhaust gas of the present invention, the LTA zeolite catalyst with improved high-temperature performance is applied to the DOC to prevent the degradation of the DOC due to temperature rise according to regeneration of the DPF.

The DOC is formed by the Pd/LTA catalyst having excellent heat resistance and the temperature of the front end portion of the DPF is controlled to a multi-stage (for example, 640° C.→670° C.) in a high temperature area, more efficiently removing the PM.

Accordingly, in the device for purifying exhaust gas according to the exemplary embodiment of the present invention, the LTA zeolite catalyst with improved high temperature performance is applied to the DOC, and thus it is possible to provide an environment that can improve the purification performance of nitrogen oxide and improve fuel economy.

Further, in the device for purifying exhaust gas according to the exemplary embodiment of the present invention, in an inactive region of selective catalyst reduction (SCR), the nitrogen oxide is stored in the LTA zeolite catalyst and in the SCR activated area, the nitrogen oxide is detached, and thus it is possible to provide an environment that can reduce the nitrogen oxide for the inactive region of the SCR during cold start.

Further, in the device for purifying exhaust gas according to the exemplary embodiment of the present invention, it is possible to provide an environment that can prevent degradation of DOC due to temperature rise according to regeneration of the DPF.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for purifying exhaust gas in an engine, the device comprising:
   an exhaust line through which the exhaust gas discharged from the engine passes;
   a diesel oxidation catalyst (DOC) that is disposed in the exhaust line to purify hydrocarbon (HC) and carbon monoxide (CO) of the exhaust gas;
   a urea injector that injects a urea aqueous solution into the exhaust line; and
   a selective catalyst reduction (SCR) that reduces nitrogen oxide of the exhaust gas passing through the DOC by use of the urea aqueous solution,
   wherein the DOC includes a Linde Type A (LTA) zeolite catalyst, wherein the LTA zeolite catalyst includes at least one of Pt, Pd, Rh, Fe, Cu, Ag, Mn, Co and Mg, and wherein the LTA zeolite catalyst includes approximately 0.1 wt % to approximately 3 wt % of Pd based on the total weight of the LTA zeolite catalyst.

2. The device of claim 1, wherein the DOC stores $NO_x$ while the SCR is in an inactive region, and the DOC detaches the stored $NO_x$ after the SCR is activated.

3. The device of claim 2, wherein a temperature in the inactive region of the SCR is less than a temperature after the SCR is activated.

4. The device of claim 1, wherein the DOC stores $NO_x$ generated in a lean condition with a predetermined amount of oxygen in the exhaust gas.

5. The device of claim 1, further including: a diesel particulate matter filter (DPF) that is formed at a rear end portion of the DOC or a front end portion of the SRC and reduces a particulate matter of the exhaust gas.

6. The device of claim 5, further comprising a controller configured to control the temperature of the front end portion of the DPF to be a predetermined temperature or higher when a predetermined amount of the particulate matter is collected in the DPF.

7. A device for purifying exhaust gas in an engine, the device comprising:
   a front catalyst device that is disposed on an exhaust line through which the exhaust gas discharged from the engine passes and includes a diesel oxidation catalyst (DOC); and
   a rear catalyst device that is connected to the front catalyst device and includes a selective catalyst reduction (SCR),
   wherein the DOC includes a Linde Type A (LTA) zeolite catalyst, wherein the LTA zeolite catalyst includes at least one of Pt, Pd, Rh, Fe, Cu, Ag, Mn, Co and Mg, and wherein the LTA zeolite catalyst includes approximately 0.1 wt % to approximately 3 wt % of Pd based on a total weight of the LTA zeolite catalyst.

8. The device of claim 7, wherein the front catalyst device or the rear catalyst device includes a diesel particulate matter filter (DPF) that reduces a particulate matter of the exhaust gas.

9. The device of claim 8, further including:
   a urea injector that injects a urea aqueous solution into the exhaust line; and a controller that is configured to control injection of the urea aqueous solution and is configured to control the temperature of the exhaust gas to be a predetermined temperature or higher when a predetermined amount of the particulate matter is collected in the DPF.

10. The device of claim 7, wherein the DOC stores $NO_x$ while the SCR is in an inactive region, and the DOC detaches the $NO_x$ stored in the DOC after the SCR is activated.

* * * * *